(12) United States Patent
Ando et al.

(10) Patent No.: US 10,976,749 B2
(45) Date of Patent: Apr. 13, 2021

(54) ROBOT AND METHOD FOR CONTROLLING THE SAME

(71) Applicant: PANASONIC CORPORATION, Osaka (JP)

(72) Inventors: Takeshi Ando, Kyoto (JP); Duyhinh Nguyen, Osaka (JP); Hiroyuki Sasai, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 309 days.

(21) Appl. No.: 15/878,968

(22) Filed: Jan. 24, 2018

(65) Prior Publication Data

US 2018/0210455 A1   Jul. 26, 2018

(30) Foreign Application Priority Data

Jan. 26, 2017   (JP) .............................. JP2017-012439

(51) Int. Cl.
   *G05D 1/02*      (2020.01)
   *G05D 1/00*      (2006.01)

(52) U.S. Cl.
   CPC ......... *G05D 1/0274* (2013.01); *G05D 1/0088* (2013.01); *G05D 1/0214* (2013.01);
   (Continued)

(58) Field of Classification Search
   CPC .. G05D 1/0274; G05D 1/0088; G05D 1/0236; G05D 1/0214; G05D 1/0255;
   (Continued)

(56) References Cited

U.S. PATENT DOCUMENTS

2004/0109012 A1\* 6/2004 Kraus ................... G01C 15/00
                                                                715/700
2008/0154504 A1\* 6/2008 Hein ........................ G01S 1/68
                                                                701/300
(Continued)

FOREIGN PATENT DOCUMENTS

JP        2000234908 A  \*  8/2000
JP           4256812        4/2009
JP        2014-194729     10/2014

*Primary Examiner* — Jonathan M Dager
*Assistant Examiner* — Jean W Charleston
(74) *Attorney, Agent, or Firm* — Wenderoth, Lind & Ponack, L.L.P.

(57) ABSTRACT

A robot and a method for controlling the robot are provided, each of which prevents the robot from hitting an obstacle when autonomous movement of the robot is controlled using an OSS. The method for controlling a robot including a plurality of rangefinder sensors, the robot being configured to autonomously move based on a map created using one or more measurement data portions of the plurality of rangefinder sensors. The method includes: deleting some of the one or more measurement data portions of the plurality of rangefinder sensors; integrating the one or more measurement data portions remaining after the deleting into an integrated measurement data portion; and determining the integrated measurement data portion to be a measurement data portion of one or more virtual rangefinder sensors which are fewer in number than the number of the plurality of rangefinder sensors.

6 Claims, 12 Drawing Sheets

(52) U.S. Cl.
CPC ......... *G05D 1/0236* (2013.01); *G05D 1/0238* (2013.01); *G05D 1/0246* (2013.01); *G05D 1/0255* (2013.01); *Y10S 901/01* (2013.01); *Y10S 901/49* (2013.01)

(58) Field of Classification Search
CPC .... G05D 1/0246; G05D 1/024; Y10S 901/49; Y10S 901/01
USPC .......................................................... 701/25
See application file for complete search history.

(56) References Cited

U.S. PATENT DOCUMENTS

| | | | | |
|---|---|---|---|---|
| 2009/0018712 A1* | 1/2009 | Duncan | ................ | G09B 19/167 701/2 |
| 2011/0178669 A1* | 7/2011 | Tanaka | ................ | G05D 1/0088 701/25 |
| 2014/0129027 A1* | 5/2014 | Schnittman | .......... | G05D 1/0219 700/253 |
| 2014/0303807 A1* | 10/2014 | Addepalli | ............. | H04W 48/18 701/1 |
| 2015/0362921 A1* | 12/2015 | Hanaoka | .............. | G05D 1/0274 701/23 |
| 2017/0010620 A1* | 1/2017 | Watabe | ................ | G05D 1/0248 |

* cited by examiner

ROBOT AND METHOD FOR CONTROLLING THE SAME

CROSS REFERENCE TO RELATED APPLICATIONS

This application is entitled to and claims the benefit of Japanese Patent Application No. 2017-012439, filed on Jan. 26, 2017, the disclosure of which including the specification, drawings and abstract is incorporated herein by reference in its entirety.

TECHNICAL FIELD

The present invention relates to a robot that moves autonomously and also to a method for controlling the robot.

BACKGROUND ART

A method of matching a previously generated map and data that is obtained from a rangefinder sensor with each other has become fairly common as a self-location recognition technique of autonomous-mobile robots used indoors. The map used in this method is generally created by manually or automatically causing in advance an autonomous mobile robot to run and using a technique called simultaneous localization and mapping (SLAM).

Meanwhile, open-source software (hereinafter, referred to as "OSS") has become rapidly widespread in various fields, today. In the field of robots as well, rapid widespread of an OSS, such as a robot operating system (ROS) or an RT middleware (RTM) has begun worldwide.

These OSSes include a technique relating to autonomous movement of robots. Configuring the robots that have been developed in-house to support these OSSes simply enables the robots to autonomously move indoors. These OSSes are made under the assumption that they are used for general-purpose robots each provided with a single rangefinder sensor at the front side of the robot.

In actual robot development, it is, however, required to install a plurality of rangefinder sensors in many cases for the purpose of measuring a broad surrounding environment. In a case where a person is to ride an autonomous mobile robot, for example, rangefinder sensors are attached to the left and right of the robot because the person rides the front side of the robot in many cases. In this case, in creating a map using an OSS, data portions respectively obtained by the left and right rangefinder sensors need to be integrated into a single data portion as if these data portions are obtained from a single virtual rangefinder sensor (hereinafter, referred to as a "virtual sensor") provided at the front side of the robot.

As a method for integrating the data portions respectively obtained by left and right rangefinder sensors, a technique has been proposed in which the data portions obtained by the respective rangefinder sensors are each converted into a data portion with reference to coordinates of a single virtual sensor, and the data portions obtained by the respective rangefinder sensors are then integrated without additional processing (see, e.g., Patent Literature (hereinafter, referred to as "PTL" 1)).

The method for creating a map according to PTL 1 will be described herein using FIG. 12. FIG. 12 is a diagram illustrating an overview of a case where a mobile robot of PTL 1 includes a plurality of rangefinder sensors and creates a map based on data portions obtained by the respective rangefinder sensors.

As illustrated in FIG. 12, mobile robot 20 is provided with ultrasound sensors 21a, 21b, and 21c at different height positions as rangefinder sensors.

Peripheral maps 22a, 22b, and 22c illustrated in FIG. 12 are maps created based on data portions obtained by ultrasound sensors 21a, 21b, and 21c, respectively. A world coordinate system of peripheral maps 22a to 22c is the same as a world coordinate system of integration map 23 formed by integration. For this reason, integration map 23 can be created by superimposing peripheral maps 22a, 22b, and 22c on top of one another while their coordinates are matched with each other without other processing.

CITATION LIST

Patent Literature

PTL 1
Japanese Patent No. 4256812

SUMMARY OF INVENTION

Technical Problem

PTL 1 described above, however, does not assume use of an OSS. For this reason, in a case where autonomous movement of a robot is controlled using an OSS, there is a problem in which a wrong map is created and the robot moving based on the map hits an obstacle.

An object of the present invention is to prevent a robot from hitting an obstacle in a case where autonomous movement of the robot is controlled using an OSS.

Solution to Problem

A method for controlling a robot, according to an aspect of the present invention is a method for controlling a robot including a plurality of rangefinder sensors, the robot being configured to autonomously move based on a map created using one or more measurement data portions of the plurality of rangefinder sensors, the method including: deleting some of the one or more measurement data portions of the plurality of rangefinder sensors; integrating the one or more measurement data portions remaining after the deleting into an integrated measurement data portion; and determining the integrated measurement data portion to be a measurement data portion of one or more virtual rangefinder sensors which are fewer in number than the number of the plurality of rangefinder sensors.

A robot according to an aspect of the present invention is a robot including a plurality of rangefinder sensors, the robot being configured to autonomously move based on a map created using one or more measurement data portions of the plurality of rangefinder sensors, the robot including a controller configured to delete some of the one or more measurement data portions of the plurality of rangefinder sensors, integrate the one or more measurement data portions remaining after the deletion into an integrated measurement data portion and determine the integrated measurement data portion to be a measurement data portion of one or more virtual rangefinder sensors which are fewer in number than the number of the plurality of rangefinder sensors.

Advantageous Effects of Invention

According to the present invention, it is made possible to prevent a robot from hitting an obstacle in a case where autonomous movement of the robot is controlled using an OSS.

DESCRIPTION OF EMBODIMENTS

Hereinafter, a description will be given of an embodiment of the present invention with reference to the accompanying drawings.

Figure 1:
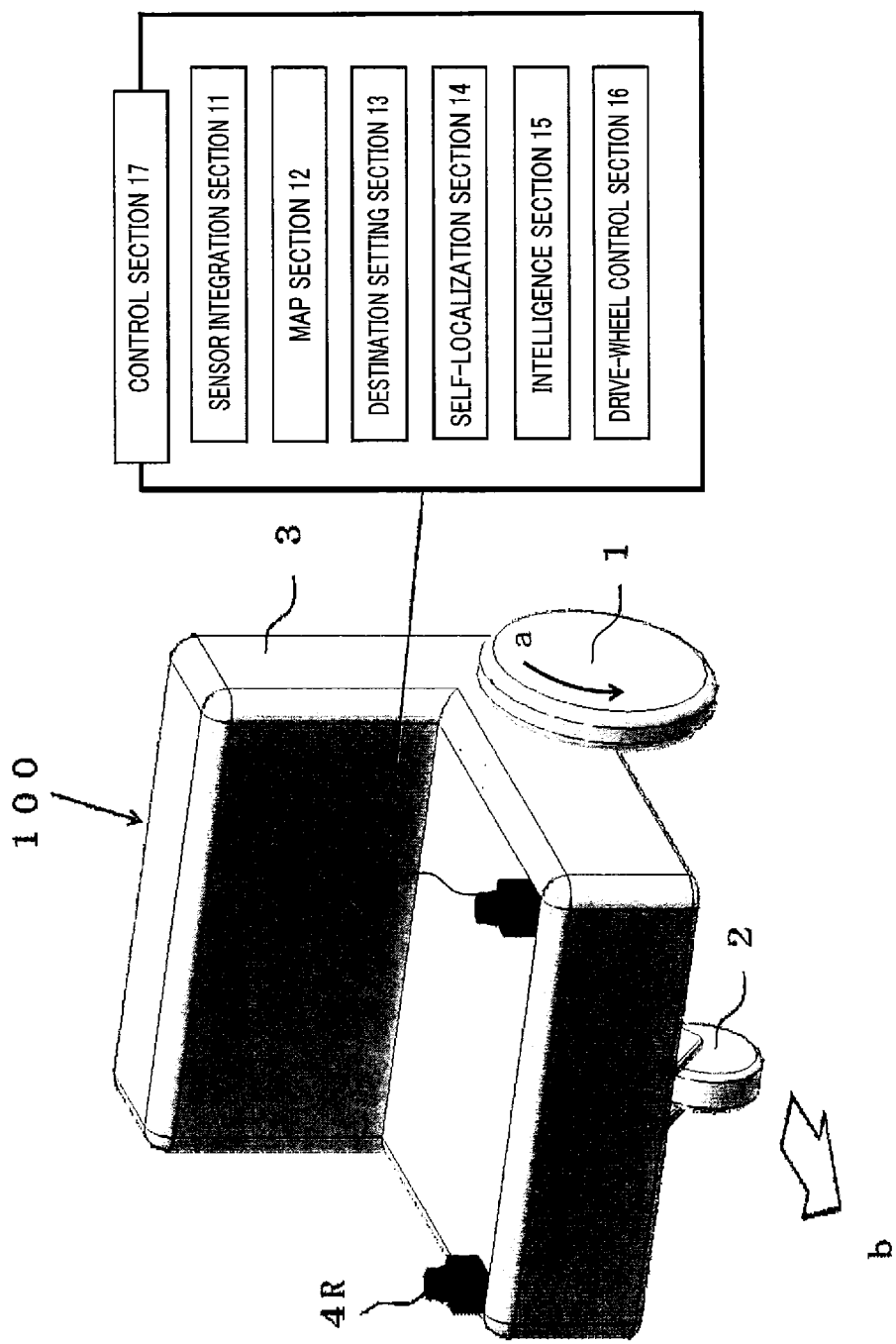
FIG. 1 is a diagram illustrating an exterior of a mobile robot according to an embodiment of the present invention and also illustrating a configuration of a control section included in the mobile robot.

First, a description will be given of a configuration of mobile robot 100 according to an embodiment of the present invention with reference to FIG. 1. FIG. 1 is a diagram illustrating an exterior of mobile robot 100 according to the present embodiment, and a configuration of control section 17 included in mobile robot 100.

As illustrated in FIG. 1, mobile robot 100 includes: mobile robot main body 3; a pair of drive wheels 1 (FIG. 1 illustrates only drive wheel 1 on one side) provided to mobile robot main body 3; one quasi-wheel 2 provided to mobile robot main body 3; laser rangefinder sensors 4R and 4L provided to mobile robot main body 3; and control section 17.

Furthermore, as illustrated in FIG. 1, control section 17 includes sensor integration section 11, mapping section 12, destination setting section 13, self-localization section 14, intelligence section 15, and drive-wheel control section 16.

Sensor integration section 11 integrates a measurement data portion obtained by measurement using laser rangefinder sensor 4R and a measurement data portion obtained by measurement using laser rangefinder sensor 4L. The measurement data portion resulting from the integration is referred to as an "integrated measurement data portion," hereinafter.

Map section 12 creates a map of a region (space) in which mobile robot 100 moves, and stores (hereinafter, the term "manages" may be used) the map.

Destination setting section 13 sets coordinates of a specific position in a map as a moving destination (destination) of mobile robot 100. The set coordinates of the moving destination are referred to as "target coordinates," hereinafter.

Self-localization section 14 estimates a current position (self-location) of mobile robot 100 based on the integrated measurement data portion and the map. The coordinates of the estimated position are referred to as "current position coordinates," hereinafter.

Intelligence section 15 creates a path through which the mobile robot moves, based on the integrated measurement data portion, the target coordinates, and the current position coordinates, and recognizes an obstacle on the path.

Drive-wheel control section 16 controls drive wheels 1 such that mobile robot 100 moves (runs) on the path created by intelligence section 15.

Mobile robot 100 runs (moves forward) in a direction of arrow "b" in FIG. 1 by rotating the pair of drive wheels 1 in a direction of arrow "a" in FIG. 1. The direction indicated by arrow "b" is referred to as a traveling direction (forward movement direction) of mobile robot 100.

Furthermore, mobile robot 100 is capable of running in a direction opposite to arrow "b" (running backward) by rotating the pair of drive wheels 1 in a direction opposite to arrow "a."

Moreover, the pair of drive wheels 1 are configured to be individually rotatable. Accordingly, by rotating the pair of drive wheels in the directions opposite to each other, mobile robot 100 can spin turn.

Laser rangefinder sensors 4R and 4L are provided on right and left sides with respect to the traveling direction of mobile robot 100, respectively. It is favorable that laser rangefinder sensors 4R and 4L are both provided in a forward most position of mobile robot main body 3 as illustrated in FIG. 1.

The configuration of mobile robot 100 has been described thus far.

Figure 2:
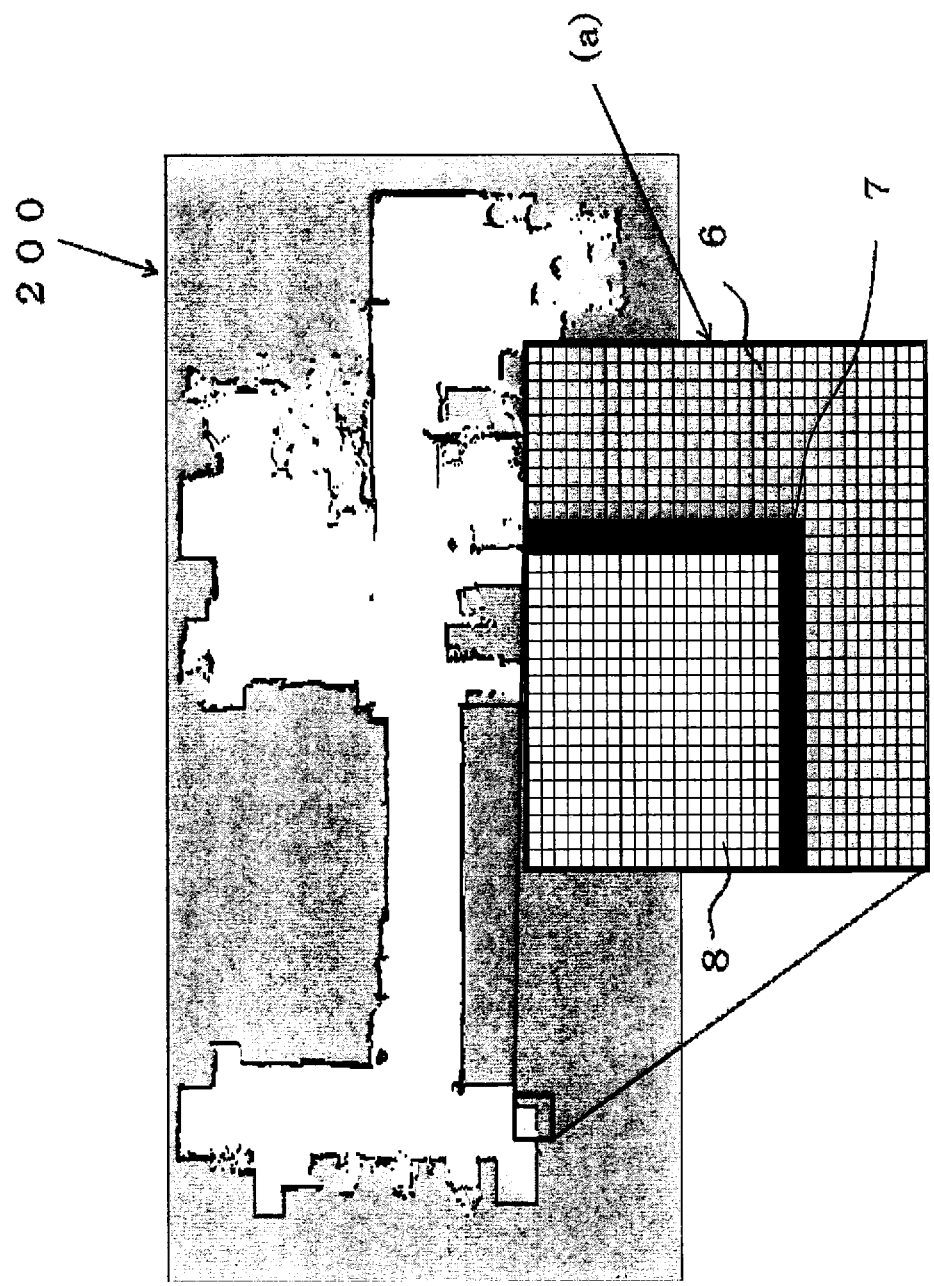
FIG. 2 is a schematic diagram illustrating an occupancy grid map used in autonomous mobile software.

Next, a description will be given of an exemplary map created and stored by map section 12, with reference to FIG. 2. FIG. 2 is a schematic diagram of occupancy grid map 200 used in an OSS (autonomous mobility software), such as ROS or RTM. A diagram indicated by (a) in FIG. 2 is a partly enlarged diagram of occupancy grid map 200.

In occupancy grid map 200, a region in which mobile robot 100 moves is partitioned into squares as grids as illustrated in the diagram indicated by (a) in FIG. 2. Each grid included in occupancy grid map 200 belongs to any one of: unknown region 6 which has neither been detected by laser rangefinder sensor 4R nor 4L; obstacle region 7 which includes an obstacle; and movable region 8 in which mobile robot 100 can move.

Next, a method for creating occupancy grid map 200 illustrated in FIG. 2 will be described using FIG. 3. FIG. 3 is a schematic diagram illustrating a method for creating an occupancy grid map at predetermined time t.

Figure 3B:
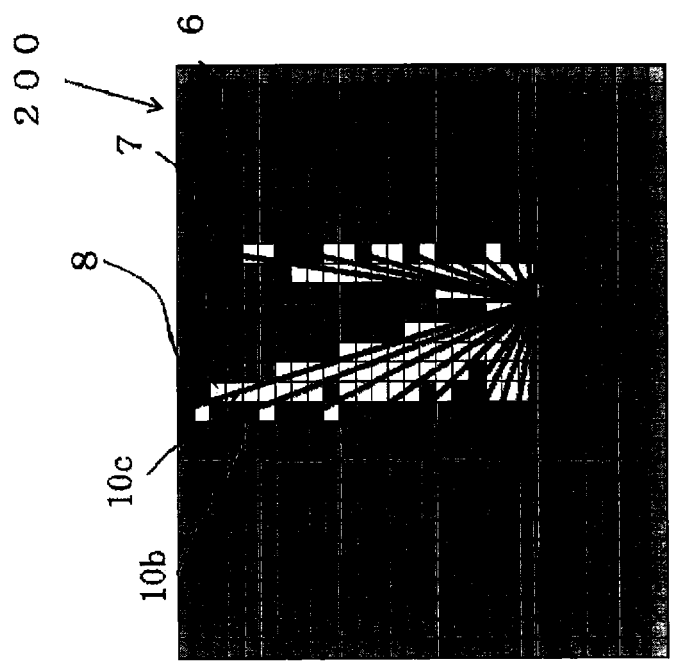
FIG. 3B is a schematic diagram illustrating an occupancy grid map created from the measurement data portions obtained by measurement performed by a laser rangefinder sensor.
Figure 3A:
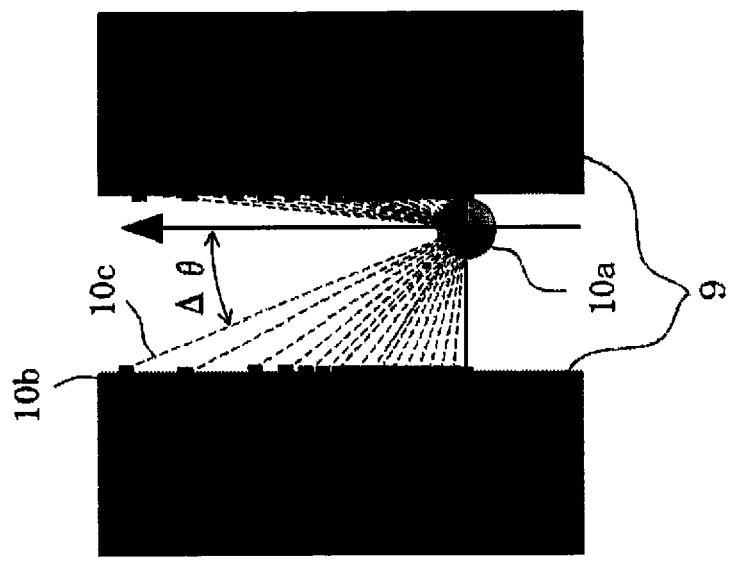
FIG. 3A is a schematic diagram depicting, around the origin of a laser rangefinder sensor, measurement data portions obtained by measurement of obstacles performed by a laser rangefinder sensor at predetermined time.

FIG. 3A is a schematic diagram depicting, around origin 10a of a laser rangefinder sensor (illustration is omitted), measurement data portions obtained by measurement of obstacle 9 performed by a laser rangefinder sensor at predetermined time t.

In FIG. 3A, each point where a laser beam emitted from a laser rangefinder sensor intersects obstacle 9 is referred to as measurement point 10b of the laser rangefinder sensor.

Moreover, in FIG. 3A, a line segment (dotted line in FIG. 3A) connecting between measurement point 10b of each laser rangefinder sensor and origin 10a is referred to as "line segment data portion 10c."

Note that, in a case where a laser beam emitted from laser rangefinder sensor 10 does not intersect obstacle 9 for a certain distance, neither measurement point 10b nor line segment data portion 10c of a laser rangefinder sensor exists.

FIG. 3B is a diagram illustrating occupancy grid map 200 created from measurement data portions obtained by measurement performed by a laser rangefinder sensor.

All the grids included in occupancy grid map 200 initially belong to unknown region 6. Map section 12 changes a grid through which line segment data portion 10e passes to movable region 8, and changes a grid including measurement point 10b of a laser rangefinder sensor to obstacle region 7. Map section 12 performs this processing continuously with time as with "t," "t+Δt," and "t+Δt+1." In this manner, occupancy grid map 200 is created.

Figure 4:
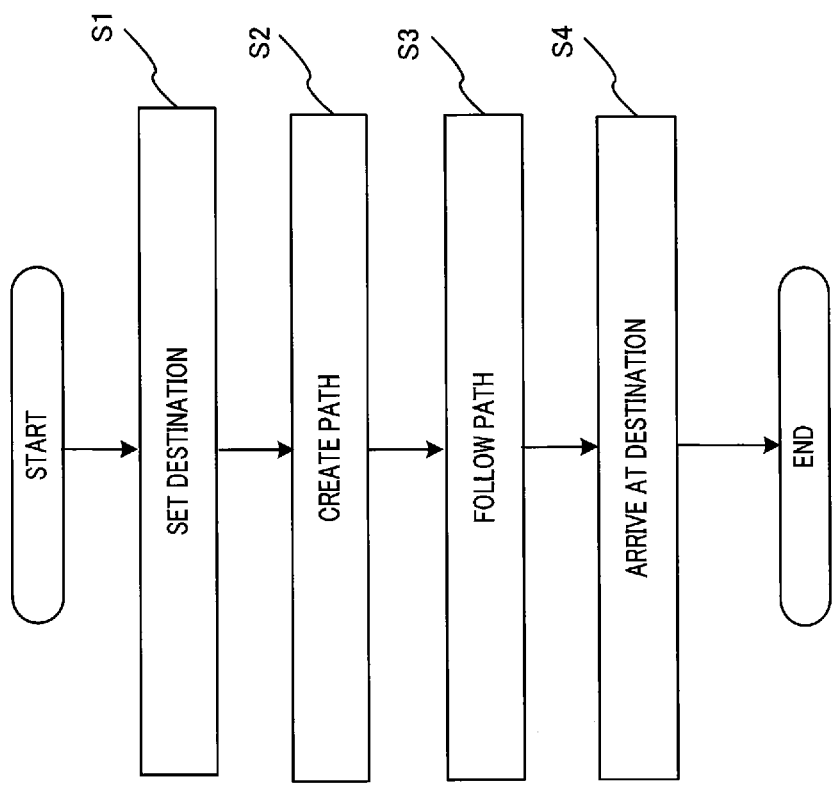
FIG. 4 is a flowchart illustrating an operation flow during movement of a mobile robot.

Next, a description will be given of an operation flow during movement of mobile robot 100 with reference to FIG. 4. FIG. 4 is a flowchart illustrating the operation flow during movement of mobile robot 100.

In step S1, destination setting section 13 sets a destination (target coordinates) of mobile robot 100 in occupancy grid map 200 managed by map section 12.

More specifically, destination setting section 13 sets any of grids forming occupancy grid map 200 to be a destination. The grid which is set at this time has to be a grid belonging to movable region 8.

In step S2, intelligence section 15 identifies a current position (current position coordinates) of mobile robot 100, which is estimated by self-localization section 14 in occupancy grid map 200 managed by map section 12, and calculates a path from the current position of mobile robot 100 to the destination of mobile robot 100, which has been set in step S1.

More specifically, intelligence section 15 searches for a grid corresponding to the current position among the grids forming occupancy grid map 200, and sets the found grid to be the current position. Intelligence section 15 then calculates a path from the grid which has been set as the current position to the grid which has been set as the destination on occupancy grid map 200. In this calculation (creation) of the path, for example, a publicly-known A (A-star) algorithm is used, but the calculation technique is not limited to this, and another publicly-known technique may be used.

In step S3, drive-wheel control section 16 controls drive wheels 1 such that mobile robot 100 moves (runs) along the created path. In this manner, mobile robot 100 moves toward the destination.

During this movement, self-localization section 14 estimates the current positon of mobile robot 100 as needed, and intelligence section 15 calculates a distance between the current position and the set destination and determines whether or not the distance becomes equal to or less than the previously set certain distance.

In step S4, in a case where the distance between the current position and the destination becomes equal to or less than the certain distance, intelligence section 15 determines that robot 100 has arrived at the destination. Moreover, drive-wheel control section 16 stops driving of drive wheels 1, and stops the movement of mobile robot 100.

Next, a description will be given, using FIG. 5, of a method for integrating a measurement data portion obtained by laser rangefinder sensor 4R and a measurement data portion obtained by laser rangefinder sensor 4L into a data portion by sensor integration section 11 as if the data portion is obtained by a virtual sensor in number (e.g., one) fewer than the number of actually installed laser rangefinder sensors (e.g., two).

Figure 5:
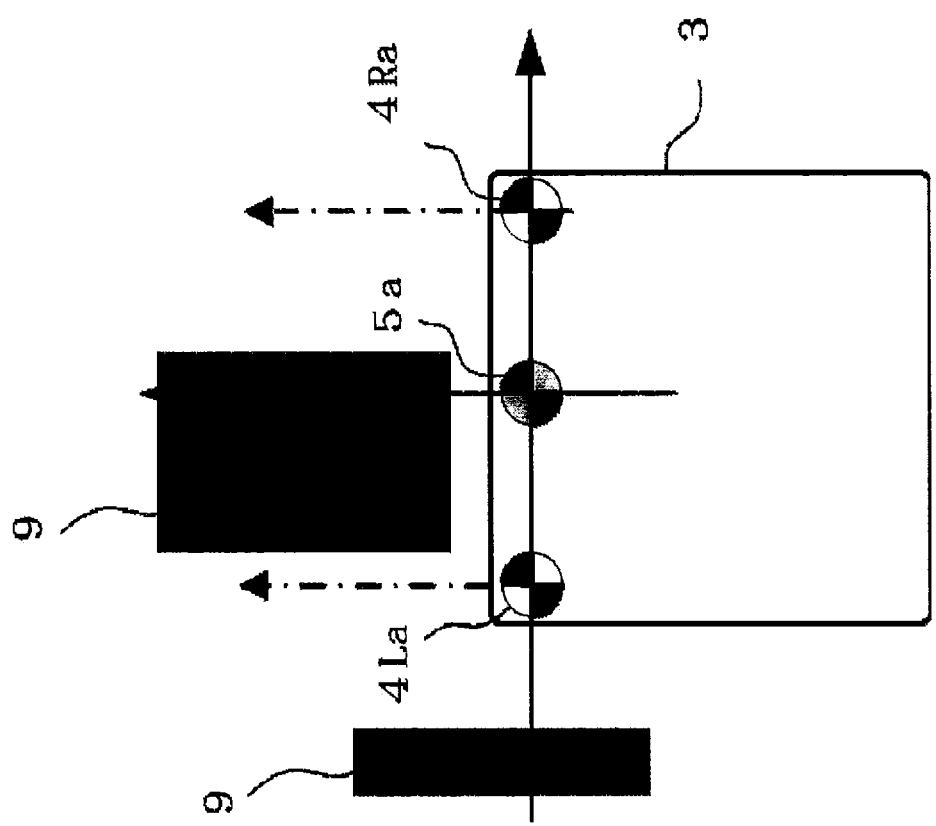
FIG. 5 is a schematic diagram illustrating a positional relationship among the origins of laser rangefinder sensors, obstacles, and a main body of a mobile robot.

FIG. 5 is a schematic diagram illustrating a positional relationship among the origin of each laser rangefinder sensor, obstacles 9, and mobile robot main body 3.

In FIG. 5, 4Ra and 4La denote the origins of laser rangefinder sensors 4R and 4L illustrated in FIG. 1, respectively. Moreover, 5a denotes an origin of a virtual laser rangefinder sensor (illustration is omitted). In this case, origin 5a of the virtual laser rangefinder sensor is assumed to be positioned on a line segment connecting between origins 4Ra and 4La of laser rangefinder sensors 4R and 4L. Note that, as long as it is on this line segment, origin 5a of the virtual laser rangefinder sensor may be at any position.

Figure 6:
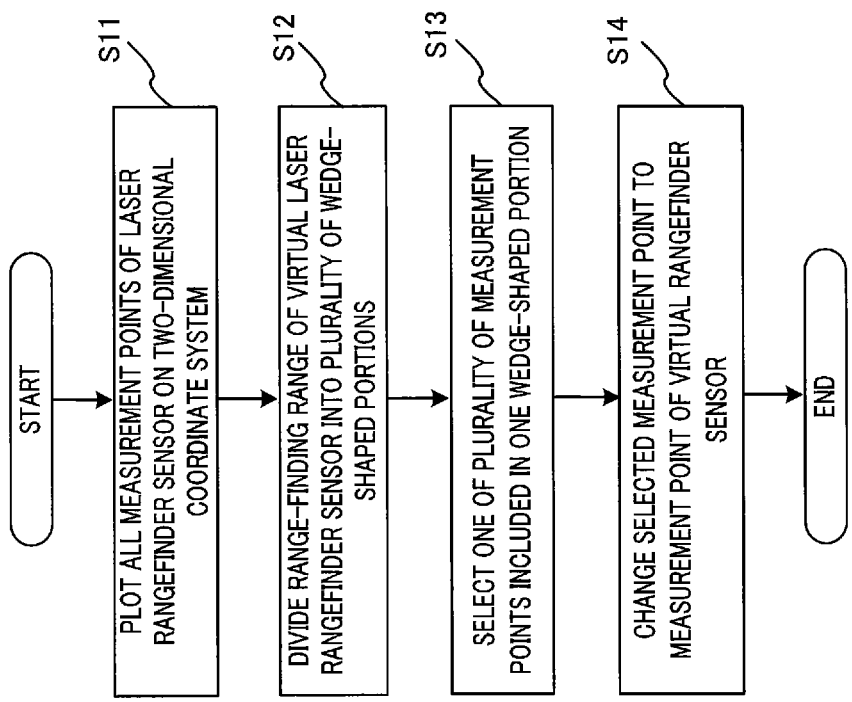
FIG. 6 is a flowchart illustrating a flow of a method for integrating a plurality of measurement data portions.

Next, a description will be given of a flow of a method for integrating measurement data portions, using FIG. 6. FIG. 6 is a flowchart illustrating the flow of the method for integrating measurement data portions.

In step S11, sensor integration section 11 plots all measurement points 4Rb and 4Lb of laser rangefinder sensors obtained by laser rangefinder sensors 4R and 4L, respectively, on a two dimensional coordinate system. This two-dimensional coordinate system is a two-dimensional coordinate system of the virtual laser rangefinder sensor.

In step S12, sensor integration section 11 divides the range-finding range of the virtual laser rangefinder sensor on the two dimensional coordinate system into a plurality of wedge-shaped portions. A specific example of this division will be described using FIGS. 7 and 8.

Figure 7:
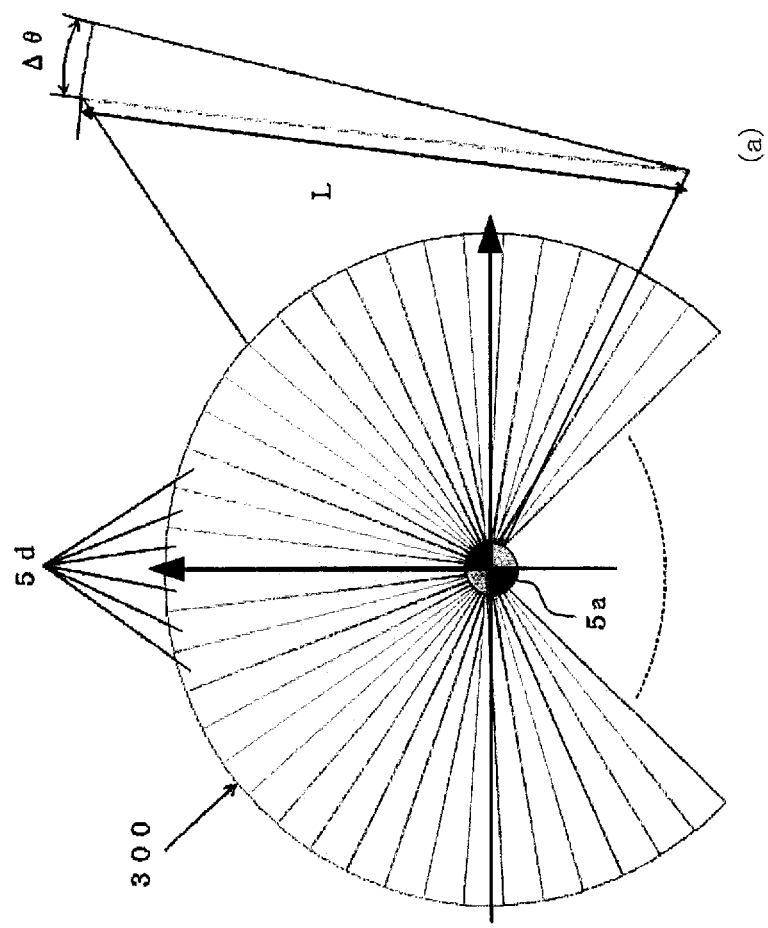
FIG. 7 is a schematic diagram illustrating a division example of a measurement range of a virtual laser rangefinder sensor.

In FIG. 7, range-finding range 300 of the virtual laser rangefinder sensor is a circle of radius L around origin 5a. Sensor integration section 11 divides this range-finding range 300 into divided wedge-shaped portions having the same shape. In FIG. 7, (a) indicates an enlarged diagram of one of the divided wedge-shaped portions. As indicated by (a) in FIG. 7, one wedge-shaped portion is a wedge-shape of radius L with a center angle equal to Δθ around origin 5a. This single wedge shape is referred to as measurement area 5d.

Figure 8:
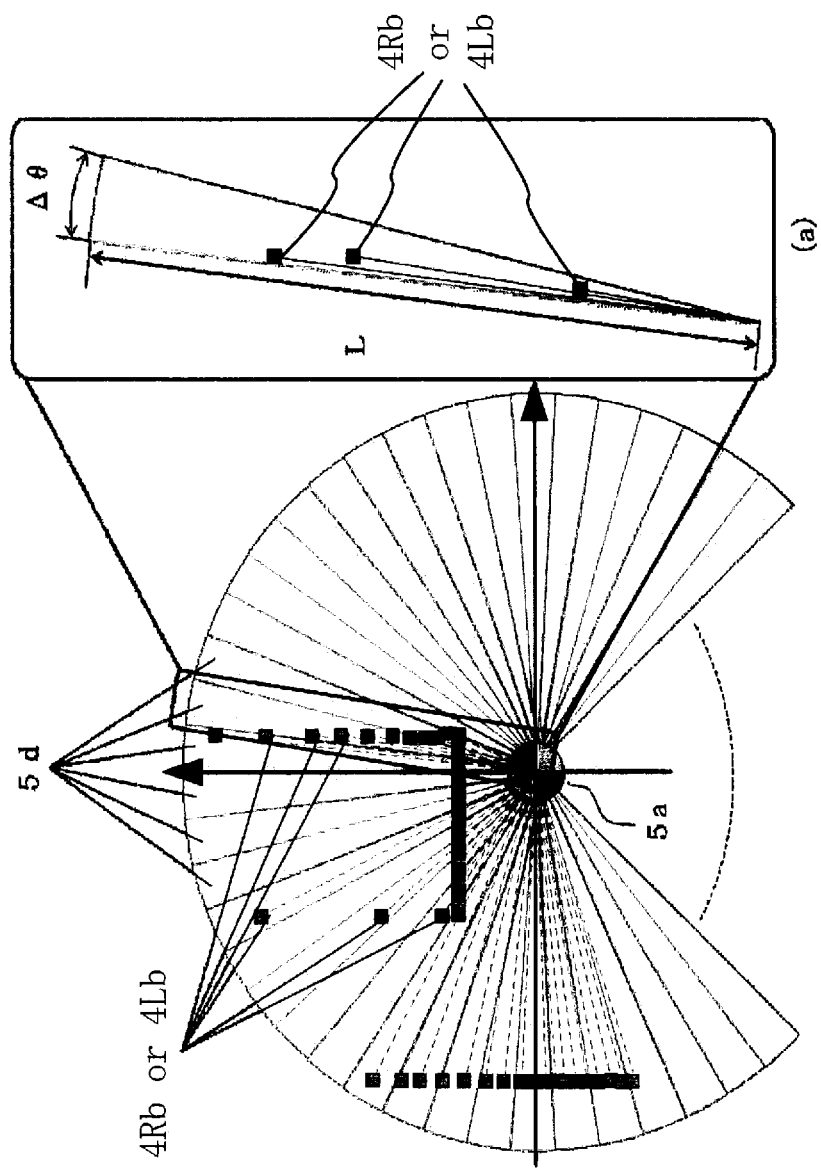
FIG. 8 is a schematic diagram illustrating examples of measurement points of a laser rangefinder sensor included in a measurement area.

Measurement area 5d may include measurement points 4Rb and 4Lb of laser rangefinder sensors as illustrated in FIG. 8.

In step S13, in a case where a plurality of measurement points of laser rangefinder sensors are included in one wedge-shape (measurement area 5d), sensor integration section 11 selects one measurement point from among the plurality of measurement points.

As indicated by (a) in FIG. 8, for example, in a case where one measurement area 5d includes a plurality of measurement points 4Rb or 4Lb, sensor integration section 11 calculates a distance from origin 5a to each of measurement points 4Rb and 4Lb.

Sensor integration section 11 selects a measurement point to which the distance from origin 5a is shortest, as processing data for integration (measurement data portion to be integrated). At this time, a measurement point other than the selected measurement point is deleted. The reason for this deletion is that the presence of the measurement point other than the selected measurement point causes an inconsistency in that, although the measurement point other than the selected measurement point cannot be measured from the position of the virtual laser rangefinder sensor in the first place, the measurement point remains even after integration of measurement data portions when the measurement data portions are integrated while a plurality of measurement points are present in one measurement area.

The processing of step S13 is performed only in a case where a plurality of measurement points of a laser rangefinder sensor are included in one measurement area 5d.

In step S14, sensor integration section 11 changes (determines) the measurement points (measurement points selected in step S13) of laser rangefinder sensors included respectively in measurement areas 5d to measurement points of the virtual laser rangefinder sensor.

Thereafter, an occupancy grid map is created based on the measurement points of the virtual laser rangefinder sensor resulting from the change, and autonomous movement of mobile robot 100 is controlled based on the occupancy grid map.

Next, a comparative example will be described using FIGS. 9 and 10, and then operational effects of the present embodiment will be described using FIG. 11.

FIG. 9 is a schematic diagram illustrating a case where occupancy grid map 200 is created without integration of measurement data portions of laser rangefinder sensors 4R and 4L at predetermined time t.

Figures 9A, 9B:
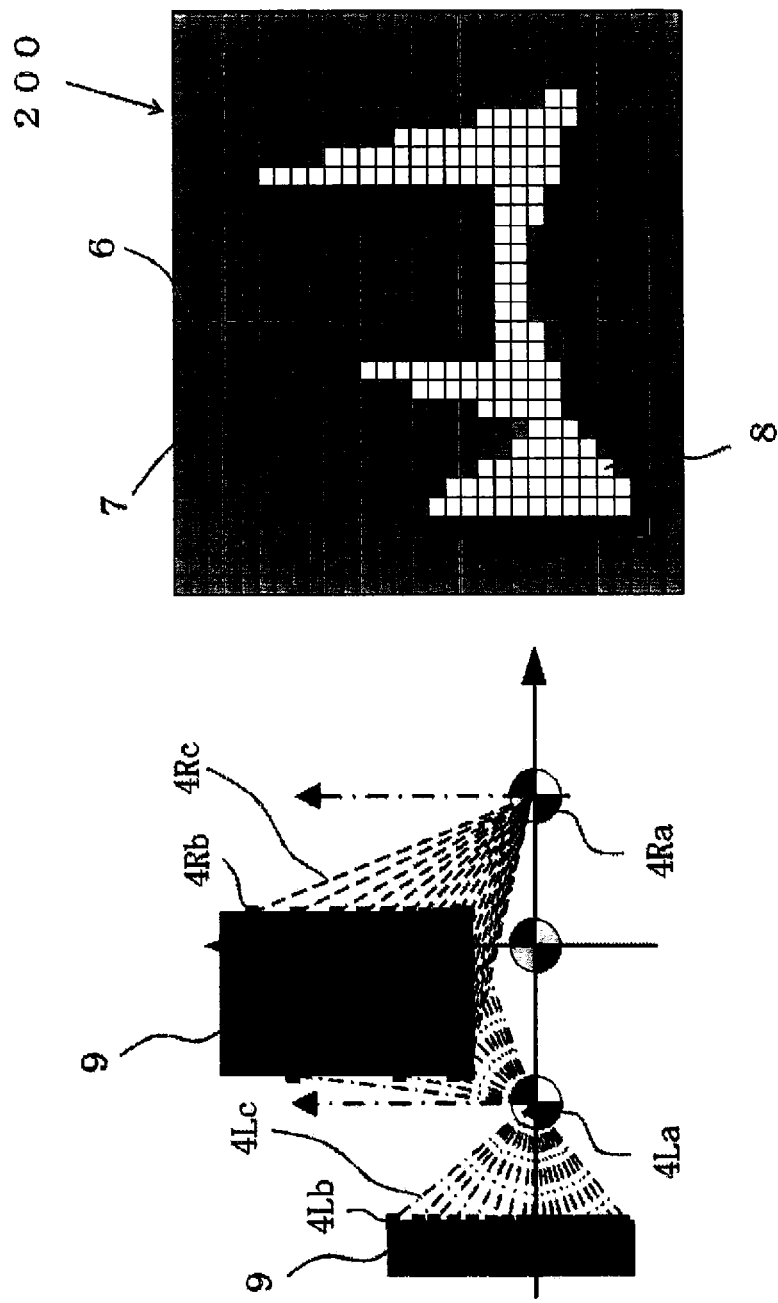
FIG. 9A is a schematic diagram depicting, around the origins of laser rangefinder sensors, measurement data portions obtained by measurement of obstacles performed by laser rangefinder sensors at predetermined time.
FIG. 9B is a schematic diagram illustrating an occupancy grid map created based on measurement points of laser rangefinder sensors obtained by measurement performed by laser rangefinder sensors, and line segment data portions.

FIG. 9A is a diagram depicting, around origins 4Ra and 4La of laser rangefinder sensors, measurement data portions obtained by measurement of obstacles 9 performed by laser rangefinder sensors 4R and 4L at predetermined time t. In FIG. 9A, 4Rb and 4Lb indicate the measurement points of laser rangefinder sensors 4R and 4L, respectively. Moreover, in FIG. 9A, 4Rc indicates a line segment data portion connecting between origin 4Ra and measurement point 4Rb while 4Lc indicates a line segment data portion connecting between origin 4La and measurement point 4Lb.

FIG. 9B is a diagram illustrating occupancy grid map 200 created based on the measurement data points 4Rb and 4Lb of laser rangefinder sensors obtained by measurement performed by laser rangefinder sensors 4R and 4L and based on line segment data portions 4Rc and 4Lc. In a case where laser rangefinder sensors 4R and 4L and obstacles 9 are in a positional relationship as described in FIG. 5, for example, the correct occupancy grid map is occupancy grid map 200 illustrated in FIG. 9B.

Meanwhile, FIG. 10 is a schematic diagram illustrating a case where the measurement data portions of laser rangefinder sensors 4R and 4L are integrated without particular processing to create occupancy grid map 200, at predetermined time t.

Figures 10A, 10B:
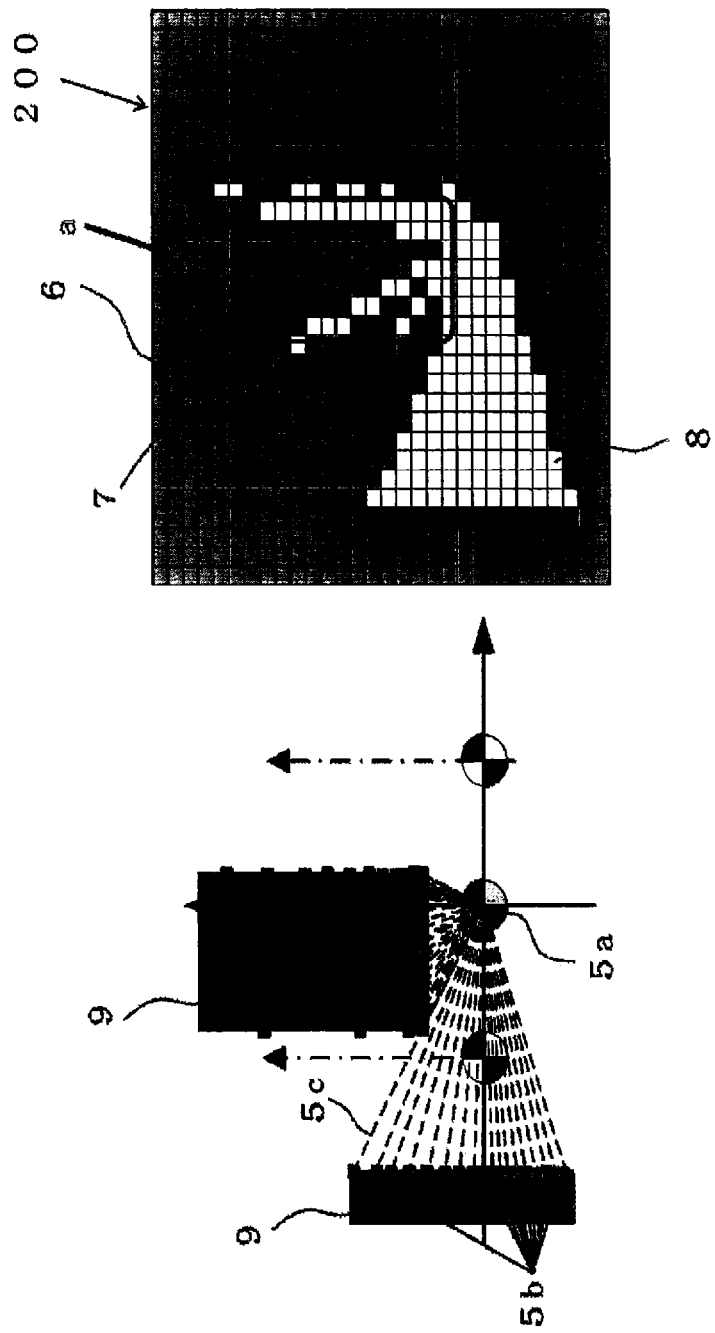
FIG. 10A is a schematic diagram illustrating a case where an assumption is made that, at predetermined time, all measurement points of laser rangefinder sensors obtained by measurement of obstacles performed by the laser rangefinder sensors are the same as the measurement points of laser rangefinder sensors, which are obtained from an origin of a virtual laser rangefinder sensor.
FIG. 10B is a schematic diagram illustrating an occupancy grid map created including inconsistencies.

FIG. 10A is a diagram illustrating an overview of a case where an assumption is made that, at predetermined time t, all measurement points 4Rb and 4Lb of laser rangefinder sensors obtained by measurement of obstacles 9 performed by laser rangefinder sensors 4R and 4L are the same as measurement points 5b of laser rangefinder sensors, which are obtained from origin 5a of the virtual laser rangefinder sensor.

In FIG. 10A, coordinates of measurement points 5b of laser rangefinder sensors are the same as the coordinates of all measurement points 4Rb and 4Lb of laser rangefinder sensors illustrated in FIG. 9A. Line segment data portions 5c are each a line segment connecting between measurement point 5b of the laser rangefinder sensor and origin 5a of the virtual laser rangefinder sensor.

As illustrated in FIG. 10A, some line segment data portions 5b intersect with obstacle 9. From this point, it can be seen that several measurement points 5b of laser rangefinder sensors that cause an inconsistency are present among measurement points 5b of laser rangefinder sensors.

FIG. 10B is a diagram illustrating occupancy grid map 200 created with the inconsistency mentioned above. In FIG. 10B, it can be seen that the region enclosed by grid line "a" is different from occupancy grid map 200 illustrated in FIG. 9B.

Originally, a mobile robot cannot enter inside obstacle 9, but the presence of movable region 8 inside grid line "a" (corresponding to obstacle 9) allows the mobile robot to enter inside obstacle 9 in occupancy grid map 200 illustrated in FIG. 10B. Accordingly, in a case where autonomous movement of the mobile robot is actually performed using the occupancy grid map illustrated in FIG. 10B, there arises a problem in that the mobile robot hits obstacle 9.

FIG. 11 is a schematic diagram illustrating a case where occupancy grid map 200 is created after one measurement point 5b is selected (measurement point 5b other than the selected one is deleted) as described in step S13 of FIG. 6. As described above, the deletion is performed because the presence of the measurement point other than the selected measurement point causes an inconsistency in that, although the measurement point other than the selected measurement point cannot be measured from the position of the virtual laser rangefinder sensor in the first place, the measurement point remains even after integration of measurement data portions when the measurement data portions are integrated while a plurality of measurement points are present in one measurement area.

Figures 11A, 11B:
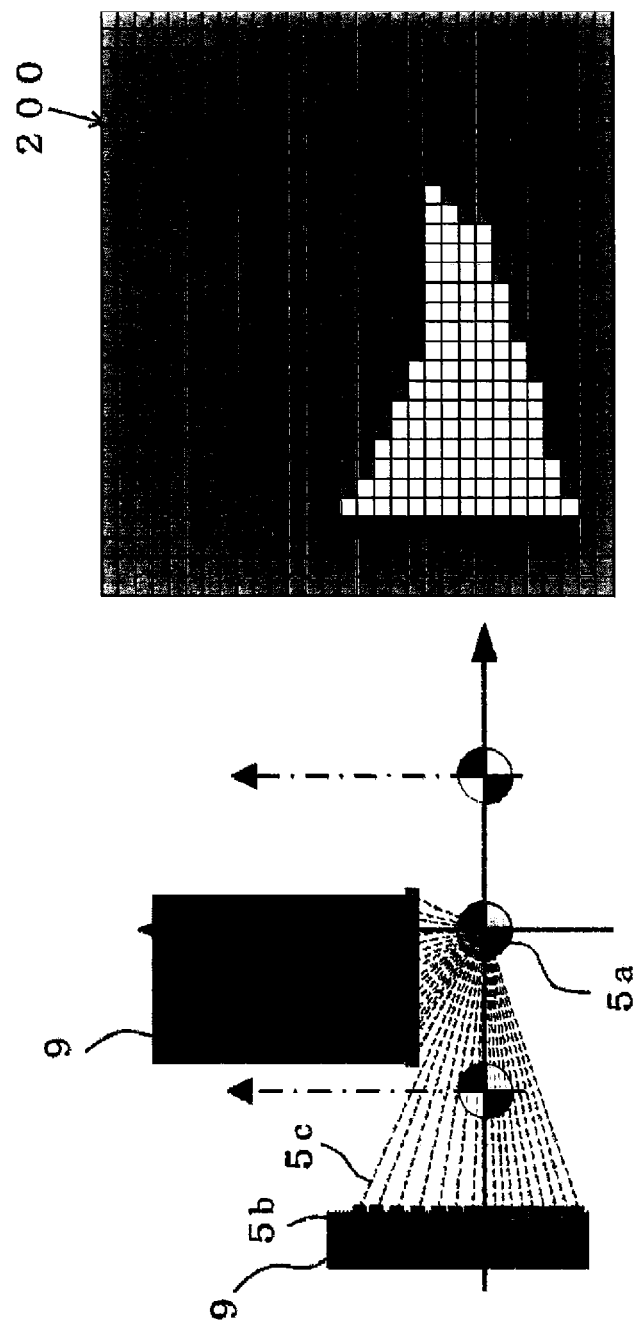
FIG. 11A is a schematic diagram illustrating measurement points of laser rangefinder sensors, which are obtained by measurement performed by a virtual laser rangefinder sensor, and line segment data portions after measurement points of a laser rangefinder sensor, which cause inconsistencies are deleted.
FIG. 11B is a schematic diagram illustrating an occupancy grid map created based on measurement points of laser rangefinder sensors, and line segment data portions.
Figure 12:
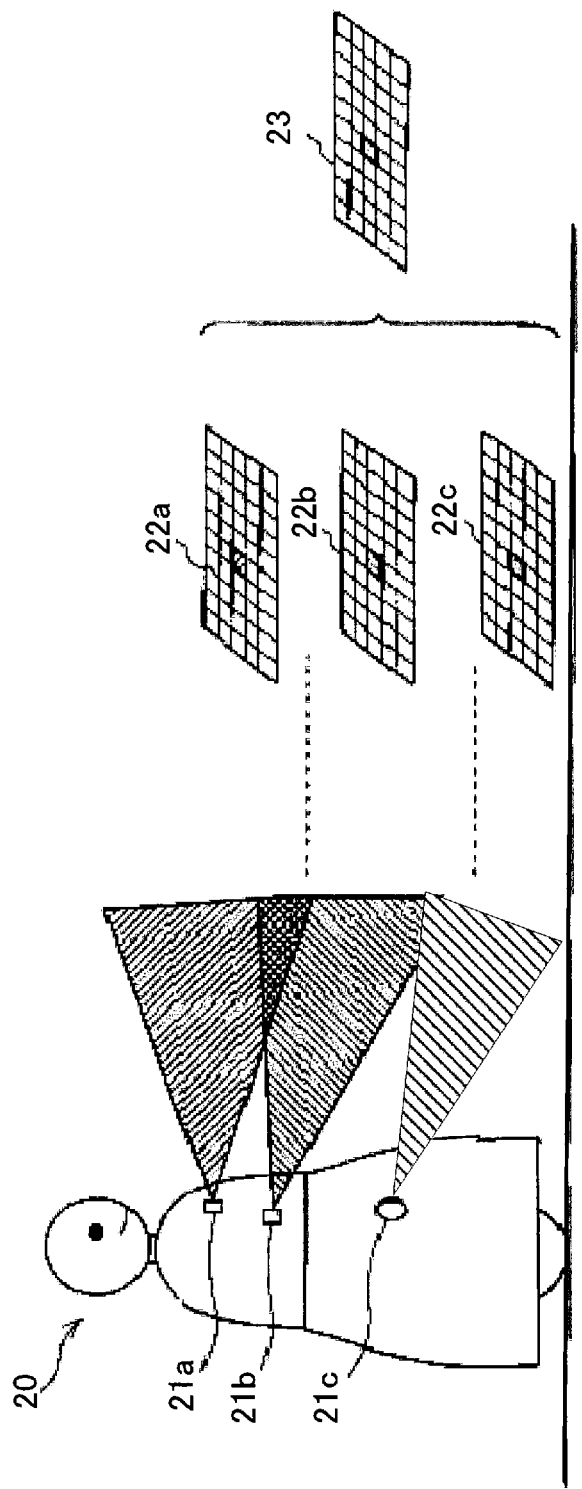
FIG. 12 is a schematic diagram illustrating a method for creating a map of PTL 1.

FIG. 11A is a diagram illustrating an overview of measurement points 5b of laser rangefinder sensors, which are obtained by measurement performed by a virtual laser rangefinder sensor, and line segment data portions 5c after deletion of measurement points 5b of laser rangefinder sensors, which cause the inconsistency.

FIG. 11B is a diagram illustrating occupancy grid map 200 created based on measurement points 5b of laser rangefinder sensors and line segment data portions 5c.

In occupancy grid map 200 as illustrated in FIG. 11B, no movable region 8 exists inside obstacle 9 unlike occupancy grid map 200 illustrated in FIG. 10B (i.e., the inconsistency does not occur). Although occupancy grid map 200 illustrated in FIG. 11B includes more unknown regions 6 than occupancy grid map 200 illustrated in FIG. 9B, as mobile robot 100 moves, more measurement data portions are obtained and the map is updated accordingly. Thus, occupancy grid map 200 illustrated in FIG. 11B eventually becomes an accurate map without inconsistencies.

Note that, although a description has been given with an exemplary case where laser rangefinder sensors (laser rangefinders) are used as rangefinder sensors in the embodiment described above, the rangefinder sensors may be ultrasound sensors, optical sensors, or camera sensors. Accordingly, the performance of autonomous movement of a mobile robot increases.

Furthermore, the integration method in FIG. 6 described above can be used not only in creating a map for an autonomous mobile robot but also in estimating the current position of mobile robot 100 by self-localization section 14.

As has been described in detail, in the present embodiment, in a case where a map is created using measurement data portions of a plurality of laser rangefinder sensors included in a mobile robot and the mobile robot autonomously moves based on the map, some of the measurement data portions of the plurality of laser rangefinder sensors is deleted, and the measurement data portions remaining after deletion are integrated into an integrated measurement data portion, and the integrated measurement data portions are determined (changed) to be measurement data portions of a virtual rangefinder sensor(s) fewer in number than the number of the plurality of rangefinder sensors.

Thus, even in a case where autonomous movement of a mobile robot is controlled using an OSS, an accurate map can be created, and thus, it is possible to prevent the mobile robot from hitting an obstacle by error.

The present invention is not limited to the description of the above embodiment and can be variously modified within a range not departing from the gist of the present invention.

INDUSTRIAL APPLICABILITY

The present invention can be utilized in the fields of autonomous movement or automatic driving of a mobile object.

REFERENCE SIGNS LIST

1 Drive Wheel
2 Quasi-wheel
3 Mobile robot main body
4R, 4L, Laser rangefinder sensor
4Ra, 4La, 10a Origin of laser rangefinder sensor
4Rb, 4Lb, 10b Measurement point of laser rangefinder sensor
4Rc, 4Lc, 10c Line segment data portion
5a Origin of virtual laser rangefinder sensor
5b Measurement point of virtual laser rangefinder sensor
5c Line segment data portion of virtual laser rangefinder sensor
5d Measurement area
6 Unknown region
7 Obstacle region
8 Mobile region
9 Obstacle
11 Sensor integration section
12 Map section
13 Destination setting section
14 Self-localization section
15 Intelligence section
16 Drive-wheel control section
17 Control section
20, 100 Mobile robot
21a, 21b, 21c Ultrasound sensor
22a, 22b, 22c Peripheral map
23 Integration map

The invention claimed is:

1. A method for controlling a robot including a plurality of rangefinder sensors, the method comprising:
    plotting a plurality of measurement points of the plurality of rangefinder sensors on a range-finding range of a virtual rangefinder sensor;
    dividing the range-finding range of the virtual rangefinder sensor into a plurality of divided measurement areas;
    for each of the plurality of divided measurement areas, (i) selecting a measurement point in the divided measurement area, (ii) deleting remaining measurement points in the divided measurement area other than the selected measurement point, and (iii) determining the selected measurement point as a measurement point of the virtual rangefinder sensor; and
    creating a map based on the measurement point of the virtual rangefinder sensor in each of the plurality of divided measurement areas, wherein
    the range-finding range of the virtual rangefinder sensor is circular,
    the plurality of divided areas are obtained by equally dividing the range-finding range of the virtual rangefinder sensor according to a predetermined angle, and
    the robot is configured to move autonomously based on the map.

2. The method according to claim 1, wherein, in each of the divided measurement areas, the deleted remaining measurement points are unmeasurable at a position of the virtual rangefinder sensor.

3. The method according to claim 1, wherein
    for each of the plurality of divided measurement areas, the selected measurement point in the divided measurement area is a measurement point, from among measurement points in the divided measurement area, having a shortest distance to a position of the virtual rangefinder sensor.

4. The method according to claim 1, wherein each of the divided measurement areas has a wedge shape having a center angle identical to the predetermined angle.

5. The method according to claim 1, wherein a current position of the robot is estimated using one or more of the measurement point of the virtual rangefinder sensor for each of the plurality of divided measurement areas.

6. A robot including a plurality of rangefinder sensors, the robot comprising a controller configured to:
    plot a plurality of measurement points of the plurality of rangefinder sensors on a range-finding range of a virtual rangefinder sensor;
    divide the range-finding range of the virtual rangefinder sensor into a plurality of divided measurement areas;
    for each of the plurality of divided measurement areas, (i) select a measurement point in the divided measurement area, (ii) delete remaining measurement points in the divided measurement area other than the selected measurement point, and (iii) determine the selected measurement point as a measurement point of the virtual rangefinder sensor; and
    create a map based on the measurement point of the virtual rangefinder sensor in each of the plurality of divided measurement areas, wherein
    the range-finding range of the virtual rangefinder sensor is circular, the plurality of divided areas are obtained by equally dividing the range-finding range of the virtual rangefinder sensor according to a predetermined angle, and the robot is configured to move autonomously based on the map.

* * * * *